Feb. 6, 1962  H. A. HINTON  3,020,064
SADDLE MOUNT
Filed July 13, 1959
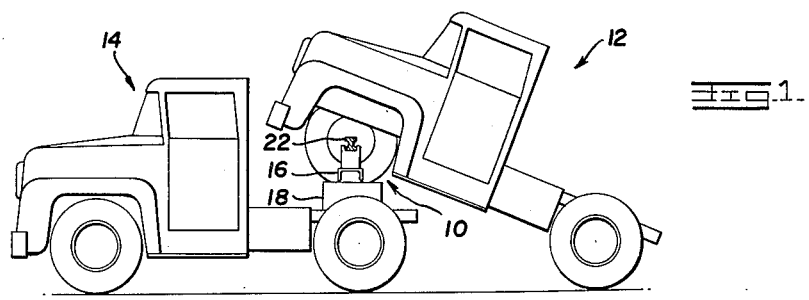
FIG. 1.
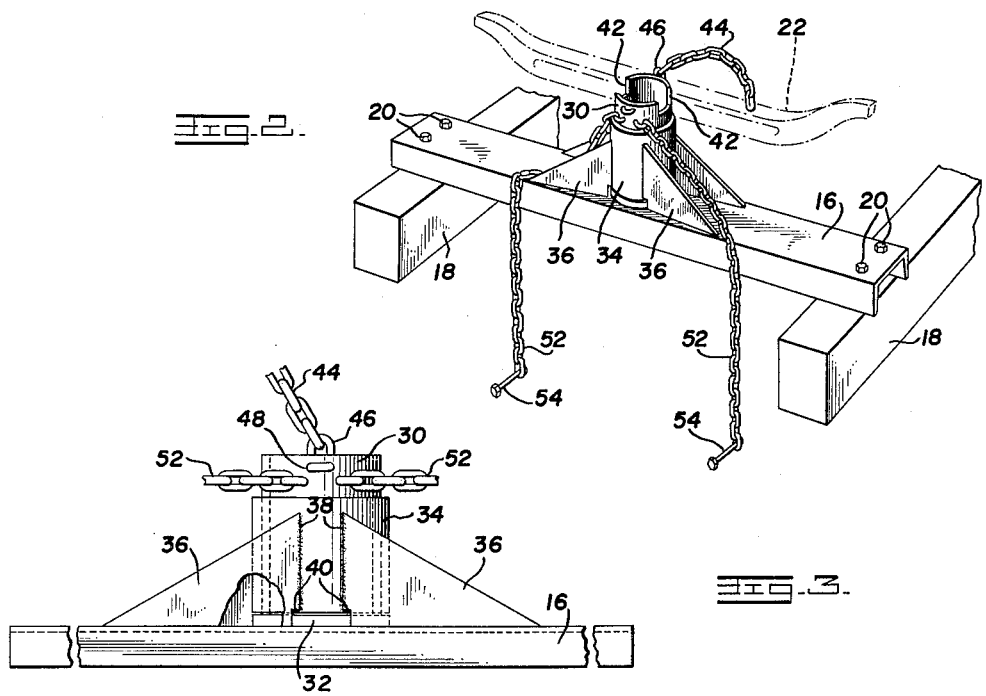
FIG. 2.
FIG. 3.
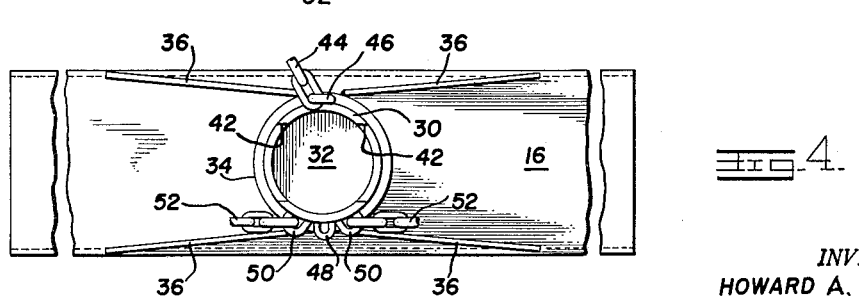
FIG. 4.
INVENTOR.
HOWARD A. HINTON

United States Patent Office 3,020,064
Patented Feb. 6, 1962

3,020,064
SADDLE MOUNT
Howard A. Hinton, 103 Peterson Court, Longview, Tex.
Filed July 13, 1959, Ser. No. 826,510
3 Claims. (Cl. 280—402)

This invention relates to improvements in a saddle mount for use in supporting one end of a vehicle on the frame or body portion of another vehicle so that the former may be conveniently hauled, towed or pushed by the latter.

In the transportation of vehicles, particularly trucks, from the place of manufacture, or from a distribution center, to other parts of the country it is common practice to provide a driver for one vehicle which is employed to tow a second vehicle. It is also common practice to elevate one end of the towed vehicle, usually the front end, and support it upon the rear end of the towing vehicle. For this purpose, a bolster structure or saddle mount, of some kind is commonly built upon the towing vehicle.

Saddle mounts in common use are subject to certain disadvantages. Usually they are complex, heavy structures comprised of many parts including universal joints, or a plurality of king pins, and many bolts necessary to hold the structure assembled. Such structures tend to concentrate the weight and twisting movements of the towed vehicle at certain points of unduly high stress. This results in frequent failures and breakage of parts and the need for their replacement plus the loss of considerable time in maintenance efforts.

Accordingly it is a primary object of this invention to provide a saddle mount of simple and inexpensive construction which avoids multiplicity of separate parts removably fastened together and which obviates the above stated disadvantages of prior art constructions.

A further object of the invention is to provide a saddle mount of integrated, unitary construction which eliminates universal joints, king pins, bolts and the like, and which is light in weight yet strong and durable in operation.

Another object of the invention is to provide a saddle mount so constructed as to distribute the weight, movements and stresses of the towed vehicle over relatively large surfaces to reduce the possibility of breakage and avoid the need for replacement parts.

Yet another object of the invention is to provide in a saddle mount a single, lightweight, inner sleeve member which rotates in an outer sleeve while supporting the axle of the towed vehicle, whereby to provide necessary turning movements about a vertical axis, the upper end of the inner sleeve being notched to cradle the towed vehicle axle while permitting limited sideward, tilting or rocking movements about a horizontal axis thus preventing stressing the frame of either vehicle during the towing operation.

Still another object of the invention is to provide a saddle mount constructed to readily receive the axle of a towed vehicle by merely hoisting the vehicle and seating the axle in a cradle to which it is fastened for limited movement by looping the free ends of a pair of chains over the springs of the towed vehicle and the free end of a third chain over its axle, the other ends of such chains being normally attached to the cradle.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawing wherein like reference characters indicate like parts throughout the several figures and in which:

FIG. 1 is a side elevation of a truck provided with an improved saddle mount according to the invention supporting the front end of another truck;

FIG. 2 is an enlarged, fragmentary perspective view of the saddle mount showing a portion of the towed truck axle in phantom;

FIG. 3 is an enlarged front elevation of the saddle mount; and

FIG. 4 is a plan view of the saddle mount.

Referring specifically to the drawings, there is illustrated a saddle mount 10 constructed in accordance with the invention and which is adapted for supporting either end of a truck 12, or other vehicle being towed, by a similar vehicle 14. The saddle mount of the invention being readily adaptable for either pulling or pushing vehicles of any description; the term "towed vehicle" as used in this specification will be understood to be applied to the vehicle partially seated on the mount whether it is being hauled or pushed by the prime or driven vehicle.

The saddle mount 10 comprises an elongate base member 16 which for lightness and strength may take the form of a steel channel of U-shape cross section which is inverted and seated on a platform of beams 18 forming part of, or built upon, the frame or body of truck 14. The base 16 extends transversely of the truck and may be secured thereto in any suitable manner as by the bolts 20 which pass through openings in the web of base 16 and in the beams 18.

Centrally of base 16 is provided a single or unitary pivot element which turns about a substantially vertical axis and simultaneously cradles the axle 22 of the towed vehicle while permitting limited side to side sway and rocking movements about a substantially horizontal axis. A preferred form of this pivot element, which distributes the stresses over relatively large surfaces, is illustrated as the sleeve or cylinder 30 closed at the bottom by a wear plate 32 which rotatably rests on the upper surface of base channel 16 and provides a circular flange protruding beyond the wall of sleeve 30.

Sleeve 30 is journalled in an outer sleeve 34 which is fastened to the base channel 16 in any suitable manner. The preferred means for securing the sleeve 34 is illustrated as comprising four right triangular reenforced plates or gussets 36, welded at 38 to the sleeve 34 and welded along their right angle sides to the channel 16. The outer sleeve thus secured is elevated above the base channel 16 to provide space in which the peripheral flange of wear plate 32 rotates. For this purpose the right angle corners of gussets 16 may also be cut away or notched as shown at 40, FIG. 3. It will be apparent that the use of a plurality of gussets to fasten the outer sleeve serves also to strengthen and stiffen the base channel.

The upper end of inner sleeve 30 protrudes from the outer sleeve 34 to provide a cradle or seat for axle 22 of the towed vehicle. For this purpose, diametrically opposed notches 42 are formed in the sleeve end. The bottoms of these notches are preferably rounded to permit a limited rocking movement of the towed axle about a horizontal axis.

To hold the axle 22 in the cradle notches 42 there is provided a tie-down chain 44, one end of which is permanently linked to the upstanding eye 46 that is welded to the upper end of sleeve 30. The other, or free end of chain 44 is adapted to be passed over the towed axle 22 and fastened in any suitable manner to the eye 48 which is welded to the front of sleeve 30.

Similarly one or more additional eyes 50 are fixed to the protruding end of sleeve 30 and which serve to permanently fasten one of the ends of a pair of wing chains 52. The free ends of chains 52 are to be looped over the side springs of the towed vehicle 12. When this is done the end links are coupled to intermediate links by bolts 54 (FIG. 2), or other suitable means such as spring latches or slips, so as to limit the transverse movements of the towed vehicle in the cradle notches 42.

The use and operation of the described device are believed to be obvious. It is merely necessary to hoist the towed vehicle 12 and lower its axle 22 into the cradle notches 42. Tie down chain 44 is passed over the axle and fastened to eye 48. The wing chains 52 are then looped over the springs of the towed vehicle and fastened as described. During hauling the double sleeves 30 and 34 permit turning of the towing vehicle 14 with respect to vehicle 12 about the vertical axis of the inner sleeve.

Road irregularities which cause the trailing wheels of the towed vehicle to bounce are accommodated for by the rocking movement of axle 22 about its own axis while seated in the notches 42. Limited side or transverse movements of axle 22 are also permitted in the cradle notches. Thus it is possible for the towed vehicle to tilt in both vertical and transverse directions relative to the towing vehicle without imparting any twisting forces to the frame of either vehicle.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. A saddle mount for supporting in elevated position over one vehicle an end of another vehicle to be towed or the like, said saddle mount comprising a base having a horizontal surface and adapted to be attached to the towing vehicle, a sleeve fixed to said base with its axis substantially perpendicular to the said horizontal surface of the base, a support member journaled in said sleeve for rotation about the sleeve axis and a portion of said support member protruding from said sleeve and forming a cradle to seat the axle of the vehicle to be towed, a plurality of reinforcing plates rigidly fastened to the sleeve and the base, said sleeve being elevated above said base and said support element being provided with a circular flange which rotates in the space between the base and the elevated sleeve.

2. A saddle mount for supporting in elevated position over one vehicle an end of another vehicle to be towed or the like, said mount having a horizontal base for rigid connection with the towing vehicle, a vertical sleeve, reinforcing means rigid with said sleeve and extending outwardly therefrom and being rigidly secured, remote from said sleeve, to said base, said sleeve being positioned by said reinforcing means so as to place the lower end of the sleeve in spaced, parallel relation to the underlying and opposed portion of said base, a support member rotatably received in said sleeve and being of a length so as to present an upper end portion projecting above said sleeve, means rigid with the lower end of said support member projecting radially outwardly therefrom to occupy the space between the lower end of said sleeve and the opposed portion of said base, whereby said support member is fixed axially relative to said sleeve while permitting of the aforesaid rotation relative thereto, the upper end of said support member defining a cradle for receiving the axle of the vehicle to be towed.

3. A saddle mount for towing one vehicle by another with the front axle of the towed vehicle elevated over and supported by the towing vehicle, with such mount being characterized by a minimum number of components while yet being effective to safely withstand the vertical as well as horizontal forces imposed thereupon incidental to towing, said mount comprising an elongate rigid base member adapted to be fixed to the towing vehicle in horizontal position, a sleeve disposed intermediate the ends of said base member in upstanding relation relative thereto, a plurality of gusset plates fixed to said sleeve and said base member serving to rigidly connect said sleeve to the base member with the lower end of the sleeve spaced above the base member, a support member of tubular form rotatably received in said sleeve, said support member being provided with a wear plate at its lower end bearing upon said base member, the wear plate being of circular shape and of a diameter greater than said support member so as to underlie the lower end of said sleeve and thus withstand vertical upward forces incidental to towing and thereby preventing axial separation of the support member from said sleeve, said support member being of a height greater than said sleeve whereby the upper end of the support member projects about the sleeve, said upper end of the support member presenting a cradle to receive the front axle of the towed vehicle and being provided with means for retaining such axle within and secured to the cradle.

References Cited in the file of this patent

UNITED STATES PATENTS

| | | |
|---|---|---|
| 1,416,896 | Simmons | May 23, 1922 |
| 2,152,279 | Randall et al. | Mar. 28, 1939 |
| 2,411,411 | Blair et al. | Nov. 19, 1946 |
| 2,436,499 | Williams | Feb. 24, 1948 |
| 2,439,854 | Lipski | Apr. 20, 1948 |
| 2,661,856 | Stanley et al. | Dec. 8, 1953 |
| 2,903,977 | Ulinski | Sept. 15, 1959 |